United States Patent
Vicars

(10) Patent No.: US 6,698,450 B2
(45) Date of Patent: Mar. 2, 2004

(54) DISCHARGE VALVE

(75) Inventor: Berton L. Vicars, Odessa, TX (US)

(73) Assignee: Gardner Denver, Inc., Quincy, IL (US)

( * ) Notice: Subject to any disclaimer, the term of this patent is extended or adjusted under 35 U.S.C. 154(b) by 28 days.

(21) Appl. No.: 10/115,017

(22) Filed: Apr. 4, 2002

(65) Prior Publication Data

US 2003/0188785 A1 Oct. 9, 2003

(51) Int. Cl.[7] ............................................. F16K 15/06
(52) U.S. Cl. ................................. 137/542; 137/516.29
(58) Field of Search ................................ 137/542, 540, 137/535, 516.29; 251/359

(56) References Cited

U.S. PATENT DOCUMENTS

| | | |
|---|---|---|
| 1,428,928 A | 9/1922 | Whaley |
| 2,011,547 A * | 8/1935 | Campbell ............... 137/542 |
| 2,909,192 A * | 10/1959 | Dobrick ................. 137/542 |
| 5,226,445 A | 7/1993 | Surjaatmadja |
| 5,362,215 A | 11/1994 | King |
| 6,039,073 A | 3/2000 | Messick et al. |

FOREIGN PATENT DOCUMENTS

| | | |
|---|---|---|
| CH | 557493 | 12/1974 |
| FR | 522661 | 9/1953 |
| JP | 58-113672 | 7/1983 |

* cited by examiner

*Primary Examiner*—Kevin Lee
(74) *Attorney, Agent, or Firm*—James B. Conte; Barnes & Thornburg

(57) ABSTRACT

A discharge valve including a valve seat and a piston having a head with a bottom surface that is convex across its entirety for engaging the valve seat. The piston has a stem extending upwardly from the head away from the valve seat. A valve guide has a socket for slidably receiving the stem of the piston and a number of apertures intersecting the socket for providing pressure relief thereto. A compressed spring is disposed between the valve guide and the head for normally retaining the piston in engagement with the valve seat.

8 Claims, 1 Drawing Sheet

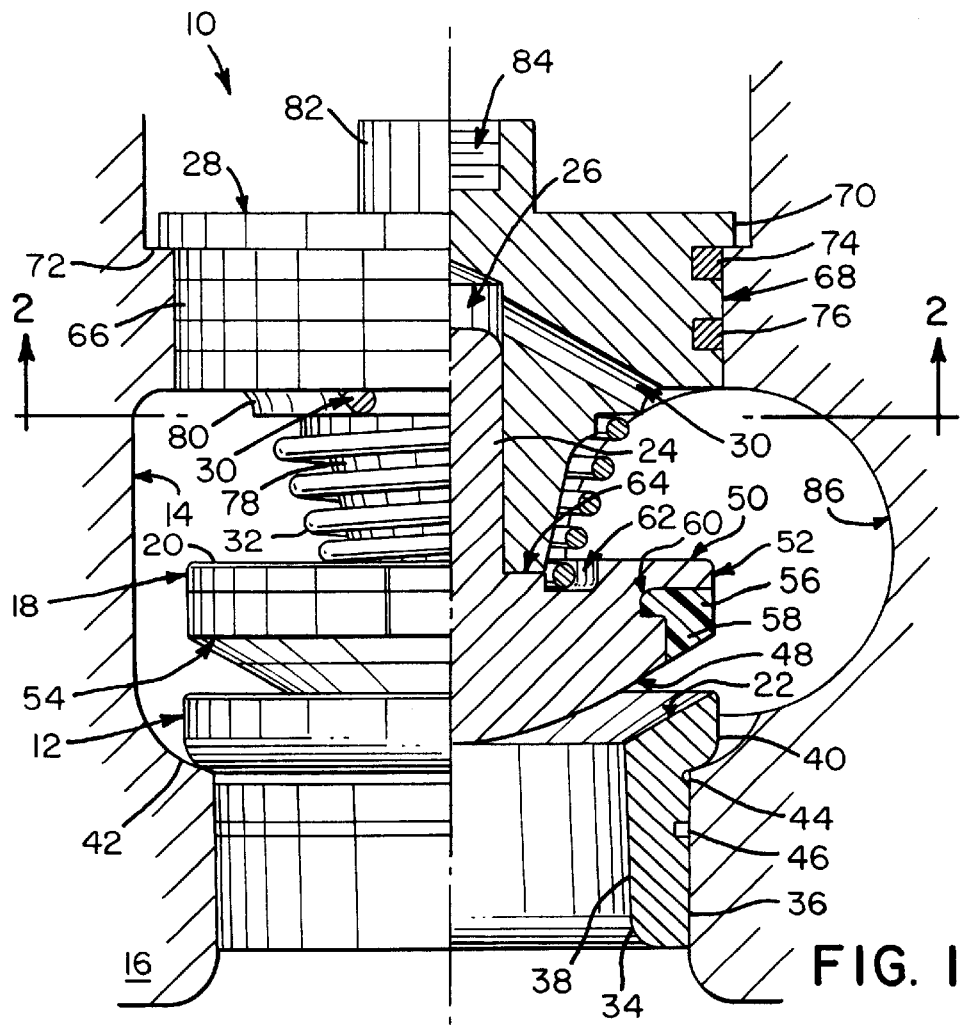
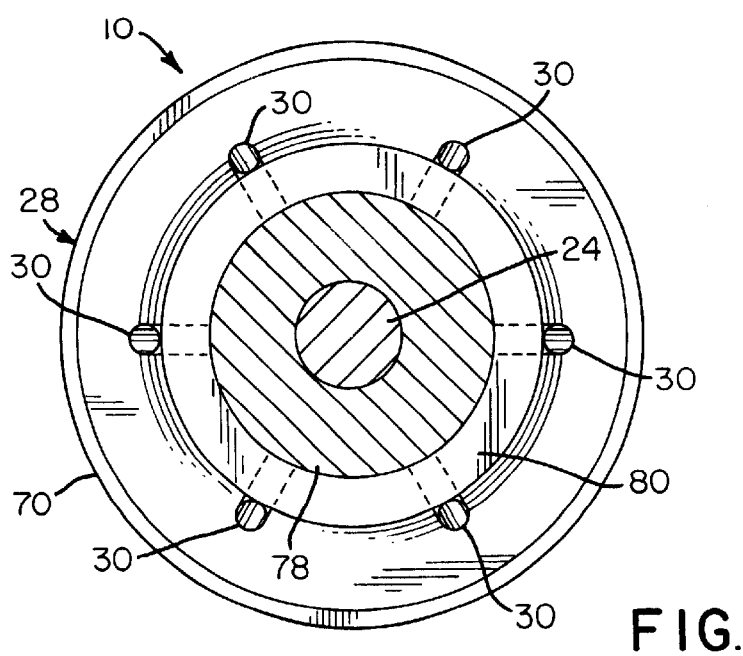

DISCHARGE VALVE

FIELD OF THE INVENTION

The present invention relates generally to fluid handling apparatus and, more particularly, to direct response valves of reciprocating type.

BACKGROUND OF THE INVENTION

It is not uncommon for subterranean reservoir rocks to be fully saturated with oil and gas yet be of such low permeability that they are not feasible to develop in an economic manner. In such cases, production rates are often boosted by resorting to hydraulic fracturing, a technique that increases rock permeability by opening channels through which reservoir fluids can flow to recovery wells. During hydraulic fracturing, a fluid such as water is pumped into the earth under extremely high pressure where it enters a reservoir rock and fractures it. Sand grains, aluminum pellets, glass beads, or other proppants are carried in suspension by the fluid into the fractures. When the pressure is released at the surface, the fractures partially close on the proppants, leaving channels for oil and gas to flow to recovery wells.

Specialized pumps are used to develop the pressures necessary to complete a hydraulic fracturing procedure or "frac job." These pumps are usually provided with so-called fluid ends within which reciprocating plungers place fluids under pressure. Suction and discharge valves control fluid flow to and from the plungers. Improperly locating a valve in the fluid end at the time of manufacture can greatly weaken the fluid end, leading to a catastrophic pump failure. Similarly, a valve that has too many projections can capture or "knock out" enough proppant to block the flow of fluid through a pump requiring, at a minimum, that time and effort be invested to clear the blockage—a costly undertaking in an oilfield environment.

Commonly used discharge valves possess a plurality of guides or "wings" that protrude into a valve seat to hold a piston in place. These wings are known to capture proppant from a fracture fluid under certain operating conditions. Such conditions should, however, be virtually nonexistent.

SUMMARY OF THE INVENTION

In light of the problems associated with fluid ends of pumps used for hydraulic fracturing, it is a principal object of the invention to provide a discharge valve that reduces the likelihood of proppant being knocked out of suspension to create a blockage. The discharge valve of the present invention, thus, offers few impediments (none whatsoever in a pumping chamber of a fluid end) to flow through a fluid end when open so that fracturing fluids can flow smoothly through it. As a result, fracturing fluids with higher than normal concentrations of suspended proppants can be pumped with substantial cost savings to the user.

It is an additional object of the invention to provide a discharge valve of the type described that, because of its compact size, can be positioned close to the suction valve that it may be paired with permitting faster transit times for a fluid through a pumping chamber and greater efficiencies in the operation of a pump.

It is another object of the invention to provide a discharge valve of the type described that can be seated in a relatively shallow pocket in a fluid end. As is well known, a valve pocket of shallow depth requires that less load-bearing material be removed from the body of a fluid end thereby enhancing the strength and durability of a fluid end. It is less likely, then, that a fluid end configured to receive the discharge valve of the present invention will fail from the development of excessive internal loads and stresses.

It is a further object of the invention to provide a discharge valve of the type described that utilizes a valve seat that abuts its supporting surface, i.e., a seat deck, at a shallow incline rather than at right angles as is common. A slope of about 30° has been found to significantly reduce zones of stress transmitted through a fluid end. It is along such stress zones that fluid ends have been known to crack and fail under load.

Still another object of the invention is to provide a discharge valve of the type described that includes special porting to reduce the likelihood that the valve will become stuck in either an open position or a closed position during use. Therefore, the valve is virtually failsafe.

It is an object of the invention to provide improved elements and arrangements thereof in a discharge valve for the purposes described which is lightweight in construction, inexpensive to manufacture, and dependable in use.

Briefly, the discharge valve in accordance with this invention achieves the intended objects by featuring a valve seat and a piston with a bottom surface that is convex across its entirety for engaging the valve seat. The piston has a stem that extends upwardly from the head away from the valve seat and into a socket in a valve guide. The socket is formed in a conical prop projecting downwardly from a disc-like plug. A number of apertures traverse the plug and intersect the socket to providing pressure relief to the socket. A compressed spring is disposed between the valve guide and the head for normally retaining the head in engagement with the valve seat.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a side elevational view of a discharge valve in accordance with the present invention with portions broken away to reveal details thereof.

FIG. 2 is a cross-sectional view taken along line 2—2 of FIG. 1.

Similar reference characters denote corresponding features consistently throughout the accompanying drawings.

DETAILED DESCRIPTION OF THE PREFERRED EMBODIMENT

Referring now to the FIGS., a discharge valve in accordance with the present invention is shown at 10. Valve 10 includes a valve seat 12 for positioning in a discharge passage 14 of a fluid end 16 and a reciprocating piston 18 for controlling the flow of fluid through passage 14. Piston 18 has a head 20 for engaging the top surface 22 of seat 12 and a stem 24 extending upwardly from head 20. Stem 24 is slidably positioned in a close-fitting socket 26 in a valve guide 28 positioned above valve seat 12 in passage 14. A number of apertures 30 connect the inner end of socket 26 with passage 14 to prevent piston 18 from becoming stuck in a raised or open position. A compressed spring 32 is disposed between the valve guide 28 and head 20 to normally retain head 20 in engagement with valve seat 12.

Valve seat 12 is a hollow cylinder or tube with top and bottom surfaces 22 and 34 that are shaped to reduce turbulence. As shown, top surface 22 is beveled such that it slopes downwardly and inwardly toward the center of seat 12 at an angle of about 30°. Bottom surface 34, however, slopes upwardly and inwardly at an incline that increases evenly from the outer wall 36 of seat 12 to the inner wall 38 thereof. Thus, bottom surface 34 is rounded.

Extending outwardly from the top of outer wall 36 of valve seat 12 is a peripheral flange 40. The bottom of flange 40 slopes downwardly and inwardly toward outer wall 36 at an angle of approximately 30°. This angle corresponds with that of a seat deck 42 in fluid end 16 that surrounds passage 14 thereby ensuring the formation of a strong platform for seat 12 capable of reducing the transmission of stresses to fluid end 16. To ensure against fluid leaks around seat 12, outer wall 36 is provided with a pair of peripheral grooves beneath flange 40 within which are positioned O-ring seals 44 and 46 for engaging fluid end 16.

Head 20 of piston 18 has a convex, bottom surface 48 that curves downward like the surface of a sphere, a planar top surface 50 and a circular, peripheral surface 52 that joins bottom and top surfaces 48 and 50 together. Bottom surface 48 is adapted to snugly engage top surface 22 of seat 12. About the periphery of bottom surface 48 is a band or insert 54 formed of hard plastic that may also engage top surface 50 and serve as seal. Insert 54 has a cross-section resembling an inverted "L" with an upper, horizontal leg 56 from which a vertical leg 58 extends downwardly. A peripheral channel 60 with a corresponding, inverted "L" shape is provided in surface 52 to receive and retain insert 54.

Top surface 50 of head 20 includes a shallow recess 62 about the base of stem 24 Recess 62 is provided to reduce the weight of piston 18 so that it can rapidly respond to fluid pressure changes in passage 14. Also, recess 62 serves as an abutment for the bottom of spring 32. A step or shoulder 64 rising from the bottom of recess 62 around step 24 insures that the bottom of spring 32 cannot shift in position and become lodged against the bottom of valve guide 28.

Valve guide 28 includes a disc-shaped plug 66 having a circular, side wall 68 and a circumferential flange 70 projecting outwardly from the top of side wall 68. Flange 70 engages a seat deck 72 in fluid end 16 surrounding passage 14. Since guide 28 transmits significantly smaller loads to fluid end 16, it is not necessary that seat deck 72 be sloped like seat deck 42. To prevent fluid leaks around plug 66, side wall 68 is provided with a pair of peripheral grooves beneath flange 70 within which are positioned O-ring seals 74 and 76 for engaging fluid end 16.

A conical prop 78 is integrally formed with plug 66 and has an exterior diameter that decreases gradually from its top, at plug 66, to its bottom, remote from plug 66. As shown, prop 78 extends downwardly from the center of plug 66 to provide an abutment for head 20 of piston 18. Socket 26 extends upwardly through the center of prop 78 and partially through plug 66. The base of prop 78 is provided with a peripheral ledge or step 80 that provides a surface through which apertures 30 may penetrate to access to the inner end of socket 26 and, in acting as an abutment for spring 32, keeps the top of spring 32 from blocking apertures 30. Preferably, guide 28 is provided with six apertures 30 that extend radially outward from socket 26 at even intervals of 60° so that if one aperture 30 happens to become blocked the others can serve as backups.

Projecting from the top of plug 66 is a sleeve 82 with interiorly threaded socket 84. Sleeve 82 is used in a conventional manner to lift guide 28 from passage 14 when it is desired to service valve 10.

From the foregoing, it should be appreciated that use of valve 10 is straightforward. After installation of valve 10 in fluid end 16, a plunger (not shown) is reciprocated beneath seat 12. As the plunger moves forward to drive fluid through seat 12, the compressive force of spring 32 is overcome and piston 18 is elevated to the position shown in FIG. 1. With head 20 being disengaged from seat 12, fluid flows smoothly through valve 10 and out port 86 in fluid communication with passage 14. When the plunger travels back to its starting point, a partial vacuum is created within seat 12 that permits the compressive force of spring 32 to drive concave bottom surface 48 and insert 54 into the top surface 22 of seat 12 thereby preventing fluid in port 86 or passage 14 to travel back through valve 10 toward the plunger.

The process of opening and closing valve 10 is entirely automatic and requires mere fractions of a second to accomplish. Since the valve 10 minimizes turbulent flow, there is little likelihood that proppant will be captured by valve 10 to block flow through passage 14 under normal conditions of use. It has been found that the resistance of valve 10 to knocking out proppant is so great that fluids containing greater proppant loads than those normally pumped can be delivered through valve 10 providing great cost savings.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A discharge valve, comprising:
    a valve seat being a tube with open, top and bottom ends;
    a piston having a head with a bottom surface that is convex across its entirety for engaging said top end of said valve seat and a stem extending upwardly from said head away from said valve seat;
    a valve guide having:
        a plug with a circumferential flange projecting outwardly from the top thereof; and,
        a conical prop projecting downwardly from said plug, said conical prop having a socket for slidably receiving therein said stem of said piston, said socket extending upwardly through said prop and into said plug; and,
        said valve guide also having at least one aperture intersecting said socket for providing pressure relief thereto; and,
    a compressed spring being is disposed about said conical prop and bearing against between said valve guide and said head for normally retaining said head in engagement with said valve seat.

2. The discharge valve according to claim 1 wherein said top end of said valve seat is beveled to slope downwardly and inwardly toward the center of said valve seat and said bottom end slopes upwardly and inwardly at an evenly increasing incline so as to be rounded.

3. The discharge valve according to claim 1 wherein said valve seat includes an outwardly extending peripheral flange, the bottom of which slopes downwardly and inwardly.

4. The discharge valve according to claim 1 wherein said piston further includes a plastic insert being a peripheral band having a inverted, L-shaped, cross section for engaging said top surface of said valve seat.

5. The discharge valve according to claim 1 wherein said valve guide further includes a peripheral ledge about the top of said prop and each of said apertures penetrates said peripheral ledge and the top of said socket.

6. The discharge valve according to claim 1 wherein each of said apertures extends radially outward from said socket to said peripheral ledge.

7. A discharge valve, comprising:

- a valve seat being a tube with open, top and bottom ends and having an outwardly extending peripheral flange at said top end, said top end sloping downwardly and inwardly toward the center of said valve seat and said bottom end sloping upwardly and inwardly;
- a piston having a head with a bottom surface mat is convex across its entirety for engaging said top end of said valve seat and a stem extending upwardly from said head away from said valve seat;
- a valve guide including:
  - a plug having a circumferential flange projecting outwardly from the top thereof;
  - a conical prop projecting downwardly from said plug;
  - a socket extending upwardly through said prop and partially through said plug; and,
  - a plurality of apertures traversing said plug and intersecting said socket for providing pressure relief thereto; and,
- a compressed spring is disposed between said valve guide and said head for normally retaining said head in engagement with said valve seat.

8. A discharge valve, comprising:

- a valve seat being a tube with open, top and bottom ends and having an outwardly extending peripheral flange at said top end;
- a piston having a head with a bottom surface that is convex across its entirety for engaging said top end of said valve seat and a stem extending upwardly from said head away from said valve seat;
- a valve guide including:
  - a plug having a circumferential flange projecting outwardly from the top thereof;
  - a conical prop projecting downwardly from said plug;
  - a socket extending upwardly through said prop and partially through said plug; and,
  - a plurality of apertures traversing said plug and intersecting said socket for providing pressure relief thereto; and,
- a compressed spring is disposed between said valve guide and said head for normally retaining said head in engagement with said valve seat.

* * * * *